US008045218B2

(12) United States Patent  
Qiao et al.

(10) Patent No.: US 8,045,218 B2
(45) Date of Patent: Oct. 25, 2011

(54) DIGITAL COMPENSATION METHOD AND APPARATUS USING IMAGE-TO-IMAGE DISTORTION MAP RELATING REFERENCE MARK GRIDS

(75) Inventors: Mu Qiao, Webster, NY (US); Robert P. Loce, Webster, NY (US); Shen-Ge Wang, Fairport, NY (US); Daniel W. Costanza, Webster, NY (US); Rakesh S. Kulkarni, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 566 days.

(21) Appl. No.: 12/251,808

(22) Filed: Oct. 15, 2008

(65) Prior Publication Data

US 2010/0091334 A1  Apr. 15, 2010

(51) Int. Cl.
 *H04N 1/58* (2006.01)
(52) U.S. Cl. ......... 358/1.5; 358/3.26; 358/504; 358/540
(58) Field of Classification Search .......... 358/1.5, 358/3.26, 501, 504, 532, 540, 302, 1.9; 399/45, 399/49, 72, 300, 301; 347/19, 115, 116
 See application file for complete search history.

(56) References Cited

U.S. PATENT DOCUMENTS

| | | | |
|---|---|---|---|
| 4,579,446 A | 4/1986 | Fujino et al. | |
| 4,587,532 A | 5/1986 | Asano | |
| 5,031,032 A | 7/1991 | Perregaux et al. | |
| 5,326,093 A | 7/1994 | Sollitt | |
| 5,473,513 A | 12/1995 | Quinn | |
| 5,489,969 A | 2/1996 | Soler et al. | |
| 5,545,913 A | 8/1996 | Quinn et al. | |
| 5,552,828 A | 9/1996 | Perregaux | |
| 5,568,246 A | 10/1996 | Keller et al. | |
| 5,570,172 A | 10/1996 | Acquaviva | |
| 5,596,416 A | 1/1997 | Barry et al. | |
| 5,604,362 A | 2/1997 | Jedlicka et al. | |
| 5,691,760 A | 11/1997 | Hosier et al. | |
| 5,748,344 A | 5/1998 | Rees | |
| 5,995,721 A | 11/1999 | Rourke et al. | |
| 6,234,602 B1 * | 5/2001 | Soto et al. ................. | 347/19 |
| 6,554,276 B2 | 4/2003 | Jackson et al. | |
| 6,607,320 B2 | 8/2003 | Bobrow et al. | |
| 6,621,576 B2 | 9/2003 | Tandon et al. | |
| 6,654,136 B2 | 11/2003 | Shimada | |

(Continued)

OTHER PUBLICATIONS

Wolberg, George, "Digital Image Warping", IEEE Computer Society Press, Los Alamitos, California, 1990.

*Primary Examiner* — Scott A Rogers
(74) *Attorney, Agent, or Firm* — Fay Sharpe LLP

(57) ABSTRACT

A digital image processing method. The method includes printing a first set of reference marks on one side of a substrate with a first print engine; printing a second set of reference marks on the same side of the substrate as the first set of reference marks with a second print engine; sensing both sets of reference marks on the substrate with an image sensing unit and generating a digital image of the reference marks; performing image analysis on the digital image to obtain an image-to-image distortion map where the image-to-image distortion map is a local measure of difference between the first set of reference marks and the second set of reference marks; and generating a compensated customer image by using the image-to-image distortion map to reduce registration errors when using the first and second print engines.

21 Claims, 12 Drawing Sheets

U.S. PATENT DOCUMENTS

| | | |
|---|---|---|
| 7,058,332 B2 | 6/2006 | Moroi |
| 7,110,687 B2 * | 9/2006 | Furukawa ................ 399/49 |
| 7,236,712 B2 * | 6/2007 | Matsuyama ................ 399/49 |
| 7,630,657 B2 * | 12/2009 | Ehara et al. ................ 399/45 |
| 7,645,013 B2 * | 1/2010 | Murakami et al. ............. 347/19 |
| 7,929,891 B2 * | 4/2011 | Tomita et al. ............... 399/301 |
| 2003/0175602 A1 | 9/2003 | Kazama |
| 2006/0050099 A1 * | 3/2006 | Murakami et al. ............. 347/19 |
| 2006/0092264 A1 | 5/2006 | Matsuzaki et al. |
| 2006/0222378 A1 | 10/2006 | Julien |
| 2006/0274337 A1 | 12/2006 | Dalal et al. |
| 2007/0139715 A1 | 6/2007 | Kazama et al. |
| 2007/0145676 A1 | 6/2007 | Biegelsen et al. |
| 2007/0165283 A1 | 7/2007 | Matsuzaki et al. |
| 2008/0226361 A1 * | 9/2008 | Tomita et al. ............... 399/301 |
| 2008/0278735 A1 * | 11/2008 | Wang et al. ................. 358/1.5 |
| 2009/0162111 A1 * | 6/2009 | Murayama ................. 399/301 |

* cited by examiner

TOTAL ERROR
210

ROTATION ERROR ELIMINATED
212

TRANSLATION ERROR ELIMINATED
214

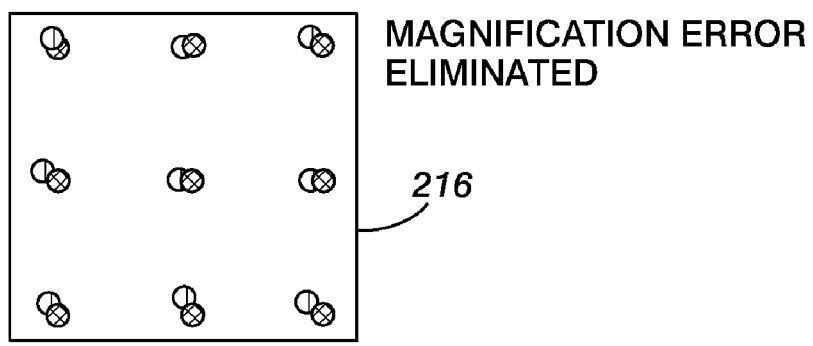
FIG. 10 — MAGNIFICATION ERROR ELIMINATED  216
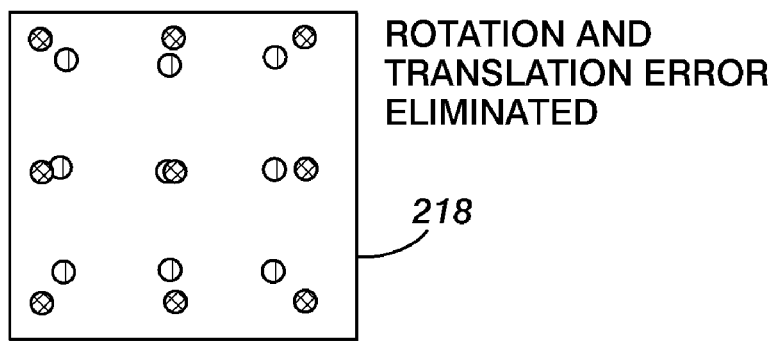
FIG. 11 — ROTATION AND TRANSLATION ERROR ELIMINATED  218

DIGITAL COMPENSATION METHOD AND APPARATUS USING IMAGE-TO-IMAGE DISTORTION MAP RELATING REFERENCE MARK GRIDS

BACKGROUND

While the exemplary embodiment is particularly directed to the art of digital image processing, and will be thus described with specific reference thereto, it will be appreciated that the exemplary embodiment may have usefulness in other fields and applications.

By way of background, serial and modular image rendering (or printing) architectures (and parallel printing architectures to some extent) enable printing on one page using more than one print engine. For instance, a printing system could be used for enhanced color printing. See, for example, US 2006/0222378 A1, by Paul C. Julien, in which highlight colors, gamut extension toners, and clear coats are printed with a second print engine. Other printers utilize more than four colorants in their printing processes.

However, print quality can suffer from misregistration defects in certain serial, modular and parallel printing architectures. Image rendering (or printing) processes are physical in nature. That is, image rendering processes rely on physical structures which can influence rendered image quality and consistency. For instance, variation in phosphor quality or density in a cathode ray tube (CRT) or plasma display, light emitting diode (LED) efficiency in an LED display, and/or spatial variation in the light output of a fluorescent back light in a liquid crystal display (LCD) can cause color appearance variations across the surface of a display device. In printing systems, physical alignments, component tolerances, wear and component age can influence the uniformity with which colorants such as inks and toners are laid down across the surface of print media.

Further, in a printer/copying machine where toner is fixed to a sheet, moisture is evaporated by the influence of heat when an image is fixed on a sheet and the sheet is shrunk, or the sheet is stretched by the influence of pressure of the fixing processing. Additionally, sheets may be out-of-skew or out-of-registrater. Rotation and slanting may occur in the case where printing is carried out using an intermediate transfer member. In that case, a difference in nip balance in an axial direction of a transfer part causes a difference between a direction in which an image is transferred and a traveling direction of a sheet, and the rotation or slanting can occur. When such slanting/rotation occurs, an image printed on the sheet may become trapezoid or fan-shaped.

Additionally, using serial and parallel printing to incorporate additional colorants or image content on a previously printed sheet can result in color halos around printed objects if the image printed by the second engine is not registered with the first printing.

Thus, the exemplary embodiments relate to a new and improved method and apparatus that resolves the above-referenced difficulties and others.

BRIEF DESCRIPTION

In one aspect of the exemplary embodiments, a digital image processing method is provided. The method comprises: printing a first set of reference marks on one side of a substrate with a first print engine; printing a second set of reference marks on the same side of the substrate as the first set of reference marks with the second print engine; sensing both sets of reference marks on the substrate with an image sensing unit and generating a digital image of the reference marks; performing image analysis on the digital image to obtain an image-to-image distortion map where the image-to-image distortion map is a local measure of difference between the first set of reference marks and the second set of reference marks; and generating a compensated customer image by using the image-to-image distortion map to reduce registration errors when using the first and second print engines.

In another aspect of the exemplary embodiments, a digital image processing system is provided. The system comprises: a first print engine that prints a first set of reference marks on one side of a substrate; a second print engine that prints a second set of reference marks on one side of a substrate; an image sensing unit operative to sense both sets of reference marks on the substrate to generate a digital image of the reference marks; a distortion determining unit operative to determine distortion between the print engines based on analysis of the digital image of the reference marks; and a distortion compensation unit operative to generate a customer image that has been compensated to reduce registration errors between images produced by the first print engine and second print engine through the use of the distortion determined from the reference marks from the two print engines.

In yet another aspect of the exemplary embodiments, a computer program product is provided. The product comprises: a computer-usable data carrier storing instructions that, when executed by a computer, cause the computer to perform a method comprising: printing a first set of reference marks on one side of a substrate with a first print engine; printing a second set of reference marks on the same side of the substrate as the first set of reference marks with the second print engine; sensing both sets of reference marks on the substrate with an image sensing unit and generating a digital image of the reference marks; performing image analysis on the digital image to obtain an image-to-image distortion map where the image-to-image distortion map is a local measure of difference between the first set of reference marks and the second set of reference marks; and generating a compensated customer image by using the image-to-image distortion map to reduce registration errors when using the first and second print engines.

BRIEF DESCRIPTION OF THE DRAWINGS

FIG. 10 illustrates an examples of an image in which magnification error has been eliminated FIG. 11 illustrates an examples of an image in which both rotation and translation errors have been eliminated

DETAILED DESCRIPTION

Aspects of the embodiments disclosed herein relate to an image rendering system such as a xerographic printing system that facilitates custom color printing as well as printing with primary colors (CMYK). The printing system includes a plurality of print engines, which may be linked by a common network of pathways connecting the print engines with each other and with an output destination. The print engines may all be under the control of a common control system for printing images from a common print job stream. The printing system can have a modular architecture that allows one or more print engines to be interchanged with other print engines. The printing system enables custom color, and process color and/or black and white printing on the same sheet in a single printing system.

Figure 1:
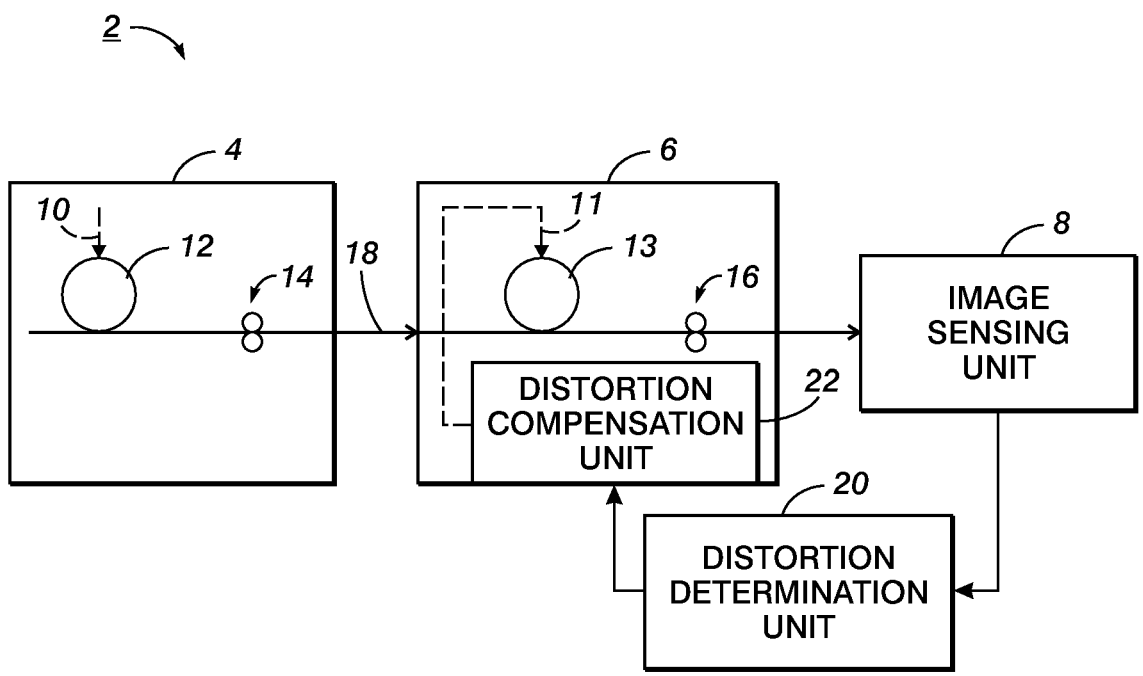
FIG. 1 is a schematic view of a printing system suitable for implementing aspects of the exemplary embodiments.

Turning now to the drawings, a simple block diagram of an image processing system (or printing system) 2 suitable for implementing aspects of the exemplary embodiments is shown in FIG. 1. The printing system 2 includes, for example, a first print engine 4, a second print engine 6, and an image sensing unit 8. For simplicity, only two print engines are shown. It is to be understood, however, that additional print engines may be included in this system. For example, the system 2 may include four print engines, one for each color (cyan, yellow, magenta, black).

The print engines 4, 6 include certain hardware elements employed in the creation of desired images by electrophotographic processes on print media such as imagers (10, 11), photoreceptors (12, 13), and fusers (14, 16). The photoreceptors 12, 13 receive the light from the imagers 10, 11. Note that the imagers could also be ink jet bars squirting ink onto an ink receptor. While particular reference is made to electrophotographic printers or print engines, suitable print engines may also include ink-jet printers, including solid ink printers, thermal head printers that are used in conjunction with heat sensitive paper, and other devices capable of printing an image on a substrate or page. It is to be appreciated that each of the print engines can include features such as an input/output interface, memory, a print cartridge platform, a print driver, a function switch, a controller and/or a self-diagnostic unit, all of which can be interconnected by a data/control bus.

"Print media" generally refers to a usually flimsy physical sheet of paper, plastic, or other suitable physical print media substrate for images, whether precut or web fed. A "print job" is normally a set of related sheets, usually one or more collated copy sets copied from a set of original document sheets or electronic document page images, from a particular user, or which are otherwise related.

As used herein, the term "data" refers generally to physical signals that indicate or include information. The terms "image" and "page," as used herein, refer to any image containing any, or all, of one or more halftone images, continuous tone images, line art or other graphics images, and/or any compilation of text, that is capable of being displayed on a display device or output on an image bearing substrate. For example, an image may be a combination of graphics and text that is stored in an image input device. The image may be a series of pixel values denoting the color, intensity, and/or any other known or later developed image property of the particular pixels that make up the image.

Each location in an image may be called a "pixel." Each pixel has certain pixel values associated with it. Each pixel value is a bit in a "binary form" of an image, or a gray scale value in a "gray-scale form" of an image, or a set of color space coordinates in a "color-coordinate form" of an image. The binary form, gray-scale form, and color-coordinate forms are each a two-dimensional array defining an image. An image can be digital, where the various forms of pixel values (i.e., bit, gray scale value, . . . ) are numerical values, or an image can be physical, such as colorants printed on a page, where pixel values are amounts of colorants at respective pixel locations. An operation typically performs "image processing" when it operates on an item of data that relates to part of an image.

In addition, the printing system 2 may incorporate "tandem engine" printers, "parallel printers," "cluster printing," "output merger," or "interposer" systems, and the like, as disclosed, for example, in U.S. Pat. No. 4,579,446 to Fujino; U.S. Pat. No. 4,587,532 to Asano; U.S. Pat. No. 5,489,969 to Soler, et al.; U.S. Pat. No. 5,568,246 to Keller, et al.; U.S. Pat. No. 5,570,172 to Acquaviva; U.S. Pat. No. 5,596,416 to Barry, et al.; U.S. Pat. No. 5,995,721 to Rourke et al; U.S. Pat. No. 6,554,276 to Jackson, et al.; U.S. Pat. No. 6,607,320 to Bobrow, et al., and U.S. Pat. No. 6,654,136 to Shimada, the disclosures of all of these references being incorporated herein by reference. A parallel printing system is one in which two or more printers are configured for contemporaneously printing portions of a single print job and may employ a single paper source which feeds paper from a common paper stream to a plurality of printers or multiple paper sources. The printers may be horizontally and/or vertically stacked. Printed media from the various printers is then taken from the printer to a common output destination. The common output destination can be a finisher where the sheets associated with a single print job are assembled or another location that is accessible from all of the printers for receiving printed media. Variable vertical level, rather than horizontal, input and output sheet path interface connections may be employed, as disclosed, for example, in U.S. Pat. No. 5,326,093 to Sollitt.

By way of example, the printing system 2 could be used to print jobs using more than four colorants for a variety of purposes such as high fidelity color, reduced texture through low load toners, special effects and security applications. In this regard, the colorants used in the print engines 4, 6 could be in a number of different configurations. For instance, the first print engine 4 could be a standard CMYK printer, while the second print engine 6 could contain nonstandard colorants, such as low load toners, hi-fi toners, or specialty colorants. Also, the standard colorants and nonstandard colorants do not need to be in separate print engines. Rather, a multiple print engine parallel printing configuration could have any number of imaging/development stations that could be used in any desired configuration. Some colorants may even be placed in more than one print engine. For example, the first print engine 4 may contain CMYK, while the second print engine 6 contains K plus three other colorants. Additionally, either one of the print engines may be used for applying print media for magnetic ink character recognition (MICR) and clear coat printing. MICR printing applies a magnetic pattern or other detectable portion to the page, for example, as a security feature for bank notes. Clear coat printing applies a transparent overcoat to a printed sheet to protect other color layers from abrasion.

Print quality can suffer from misregistration defects in printing architectures such as the printing system 2 described above. For example, small within-page distortion (e.g., bow, skew, nonlinearity) may occur due to the imager 10 of the first print engine 4 and/or the imager 12 of the second print engine 6, while distortion (magnification) may result from the fuser 14 of the first print engine 4 and/or the fuser 16 of the second print engine 6. Misregistration can result for imperfect and irregular hand-off of the print media from print engine 4 to print engine 6. As a result, translation and/or rotation may vary from print to print along the paper path 18. Using serial and parallel printing systems to incorporate additional colorants or image content on a previously printed sheet can result in color halos around printed objects if the image printed by the second print engine 6 is not properly registered relative to the first print engine 4.

Further, fusing a print in the first print engine 4 can lead to dehydration of the paper and, consequently, distortion of the paper, among other things. The distorted paper is subsequently passed onto the second print engine 6. As a result of these effects, image quality and reliability may be negatively impacted for the printing system 2. Distortion of the paper can lead to misalignment of the image portions printed in the two print engines 4, 6, and even with a perfect shift and tilt registration between two engines the resulting artifact due to the misalignment may be still perceptible and objectionable.

It should be understood that a sheet registration system in the first print engine 4 may deliver sheets of all kinds to specified positions and angles for subsequent functions within printers, copiers and other printing machines. The subsequent functions may include transferring an image to the sheet, stacking the sheet, slitting the sheet, etc. Conventional mechanical registration systems may correct for skew, lateral offset, process-direction errors, etc. "Skew" is the angle the leading edge of a sheet being transferred differs from perpendicular to the desired direction of transfer. "Lateral offset," or "cross-process offset," is the lateral misalignment of the sheet being transferred with respect to the desired transfer path. "Process-direction" relates to the primary direction of movement of a sheet within the printing machine as that sheet moves through the various destinations required in the printing process.

In current high speed copiers and printers, active registration systems are used to register the sheets accurately. In an active registration system, a sheet is passed over sensor arrays from which the sheet skew, lateral offset, and process-direction errors are calculated. Skew is corrected in some registration systems by rotating drive rollers on opposite ends of a common drive axis at different velocities. Lateral offset may be corrected, for example, by moving the rollers in unison to one side or another. Process-direction errors may be corrected, for example, by driving the rollers faster or slower.

Upon completion of the registration process, which corrects for skew, lateral offset, and process errors, the sheet is aligned along a desired transfer path and is ready to receive an image within a pre-defined image area, such as the area defined within 1 inch margins or borders of the sheet. Thus, following the registration process each sheet is delivered to an imaging station where an image is created on the surface of the sheet. In some print engines, the sheet is then passed through a fuser that fuses the image to the sheet. It is typically desirable for the image to be centered within the predefined image area.

However, there is a need for a method of measuring misregistration in images in order to enable digital compensation and thus improve image-to-image registration in a printing system. To accomplish this task, the system 2 may include the image sensing unit 8, a distortion determining unit 20 for determining distortion between the print engines, and a distortion compensation unit 22 for generating a digital image that has been compensated to reduce registration errors between images produced by the first print engine 4 and the second print engine 6.

The image sensing unit 8 may comprise any type of electronic sensor including a charge coupled device (CCD) array or a full width array (or imaging bar). A CCD or full width array typically comprises one or more linear arrays of photo-sites, wherein each linear array may be sensitive to one or more colors. In a color image capture device, the linear arrays of photo-sites are used to produce electrical signals which are converted to color image data representing the scanned document. Examples of full width arrays that can be used in the image sensing unit 8 are disclosed in, for example, U.S. Pat. No. 5,031,032 to Perregaux, et al.; U.S. Pat. No. 5,473,513 to Quinn; U.S. Pat. No. 5,545,913 to Quinn et al.; U.S. Pat. No. 5,552,828 to Perregaux; U.S. Pat. No. 5,604,362 to Jedlicka et al.; U.S. Pat. No. 5,691,760 to Hosier et al.; U.S. Pat. No. 5,748,344 to Rees; and U.S. Pat. No. 6,621,576 to Tandon et al., all of which are hereby incorporated by reference in their entirety.

The distortion determining unit 20 and the distortion compensation unit 22 generally comprise conventional computer components, including a central processing unit (CPU), memory storage devices for the CPU, and connected display devices, for running one or more computer programs. Such computer program(s) may be stored in a computer readable storage medium, such as, but is not limited to, flash drives, hard drives, floppy disks, optical disks, CD-ROMs, magnetic-optical disks, read-only memories (ROMs), random access memories (RAMs), EPROMs, EEPROMs, magnetic or optical cards, DVDs, or any type of media suitable for storing electronic instructions, and each coupled to a computer system bus. The functions of the distortion determination unit 20 and the distortion compensation unit 22 will be described in greater detail below.

The printing system 2 described above is suitable for implementing an exemplary digital registration method. In particular, the system 2 is adapted to render at least two prints with reference marks such as grids. Using at least two prints, each with the two grids, will help to provide a good estimate of repeatability. A lower quality system could get away with one print having the two grids. The estimate of the distortion map will not be as good, but it could be better than not using the distortion map and correction method at all. Note that these are calibration prints that provide the data for compensating for repeatable registration error components in future prints. The calibration process involves scanning, measuring misregistration, splitting registration error into components (estimating rotation, translation, magnification, nonlocal), and deciding which components are repeatable. The calibration process can use many prints to estimate the predictable components of misregistration. The predictable component arrayed as a grid of displacements, or parameters, such as a magnification factor, is the distortion map. The distortion map is used in the subsequent step to resample the digital image separation of a future print to match the distortion, which is the warp operation that compensates for the predictable components.

Figure 2:
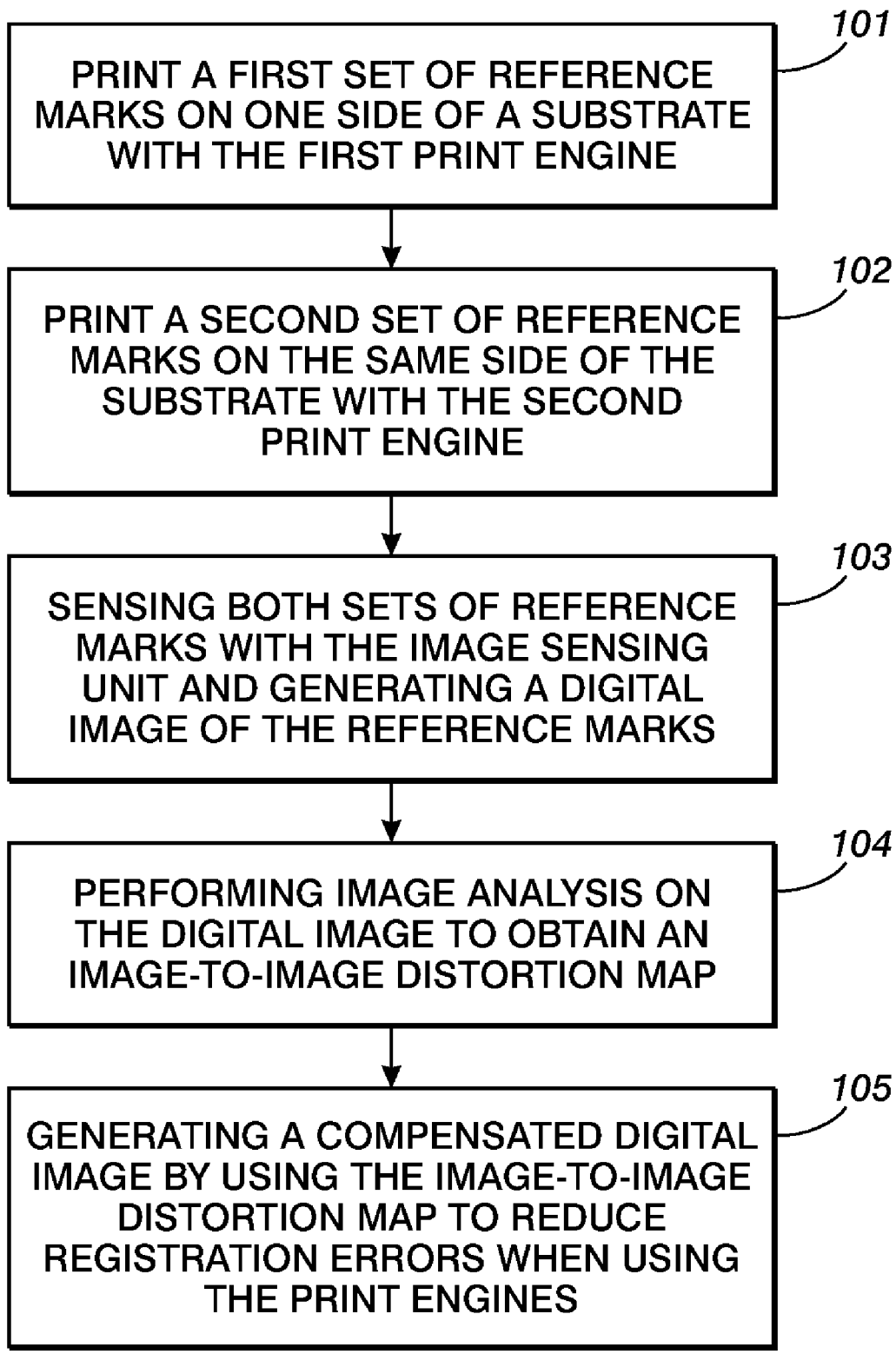
FIG. 2 is a flowchart outlining an exemplary embodiment of a method of providing improved registration using reference marks and digital realignment.

FIG. 2 is flowchart illustrating an exemplary digital registration method for a customer image. The exemplary method includes: printing a first set of reference marks on one side of a substrate with the first print engine 4 (101); printing a second set of reference marks on the same side of the substrate as the first set of reference marks with the second print engine 6 (102); sensing both sets of reference marks on the substrate with the image sensing unit 8 and generating a digital image of the reference marks (103); performing image analysis on the digital image to obtain an image-to-image distortion map where the image-to-image distortion map is a local measure of difference between the first set of reference marks and the second set of reference marks (104); and generating a compensated customer image by using the image-to-image distortion map to reduce registration errors when using the first and second print engines (105). These steps will be discussed in greater detail below.

The prints with the reference marks are calibration prints that provide the data for compensating for repeatable registration error components in future prints. The set of reference marks rendered by each of the print engines may be in the form of dots or lines in a written grid pattern. Generally, each written grid pattern represents a different colorant. Thus, for example, the first written grid pattern may be black and the second grid pattern may be taken from the group of cyan, magenta, yellow, black, orange, violet, red, green, light cyan, light magenta, gray, and dark yellow.

The image sensing unit 8 is used to scan the pair of grid patterns printed on the substrate and generate a digital image. The image sensing unit 8 is placed after the second print engine 6 in order to sense both grid patterns. As noted above, full width arrays are currently employed in printers and are generally considered useful in achieving consistent and uniform image quality in color printing. The written grid is used for measurement, then it is possible to interpolate between the written marks to get a grid that could be as fine as the pixel resolution for representing the image-to-image distortion map.

Figure 3:
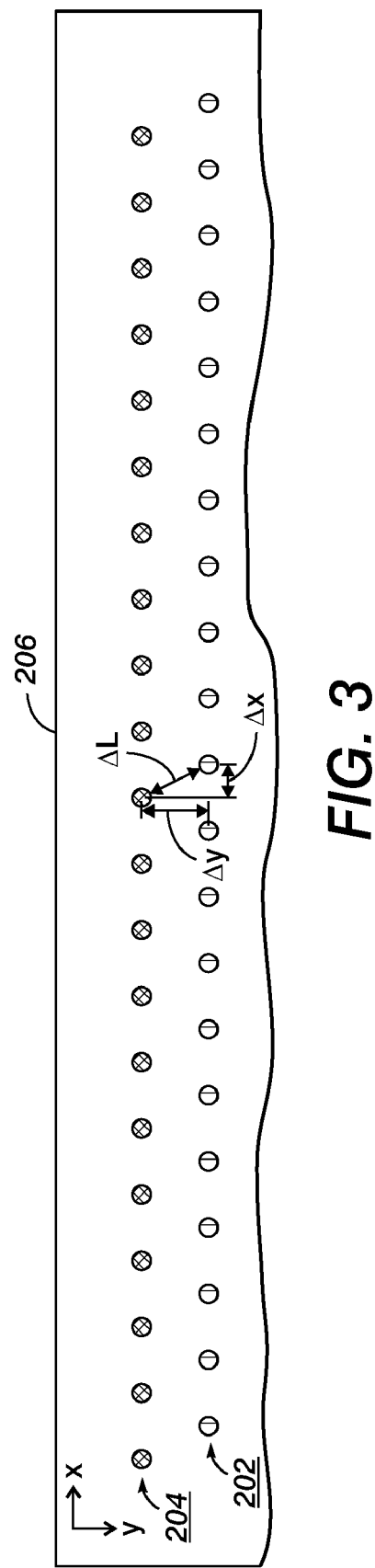
FIG. 3 illustrates relative displacement measurement in accordance with aspects of the exemplary method.

The digital file is then sent to the distortion determination unit 20 for image analysis. We turn now to FIG. 3, which shows a first set of reference marks (or grid) 202 and a second set of reference marks (or grid) 204 on a sheet 206. The next step is to estimate the relative registration errors in the second set of reference marks 204 with respect to the first set of reference marks 202 on the sheet 206. (It is also possible to estimate the relative errors in the first set of reference marks with respect to the second set of reference marks.) The registration error, in general, is two dimensional. So, generally, the distortion determining unit 20 must determine registration error information for both process- and cross-process directions.

The relative registration errors may be decomposed into some number of global misregistration components (e.g., translation, rotation, and magnification errors) and local distortion. The registration error may be decomposed into these components for reasons such as the consistency of the component. For instance, if translation error is random and unpredictable sheet-to-sheet, then measurement of the translation error from reference marks, and attempts to correct for it on future printed sheets will not be successful. On the other hand, local distortion tends to be repeatable sheet-to-sheet, and therefore is a good candidate for correction on future sheets.

Mean-Squared Error (MSE), or Mean Square Difference between two sets of data is one of many ways to quantify the amount by which the sets of data differ. MSE measures the average of the square of the "error." A measure of the global misregistration components is estimated by minimizing mean-squared error between the grids using the appropriate parameters and functional form for the desired global misregistration component. For instance, rotation misregistration can be estimated by applying a rotation of coordinates functional form to one of the reference grids using a rotation angle $\alpha$. The angle $\alpha$ could be varied in some iterative manner until a value for $\alpha$ is found that produces the lowest MSE between the reference grids. That angle $\alpha_m$ would be the minimum MSE estimate of the rotation component of the misregistration. Analogous processes could be followed for estimating the translation misregistration component and the magnification misregistration component. The translation functional form would utilize an offset in the process direction and an offset in the cross-process direction as parameters that can be varied to minimize MSE. The magnification functional form would utilize a scale factor in the process direction and a scale factor in the cross-process direction as parameters that can be varied to minimize MSE.

Figure 4:
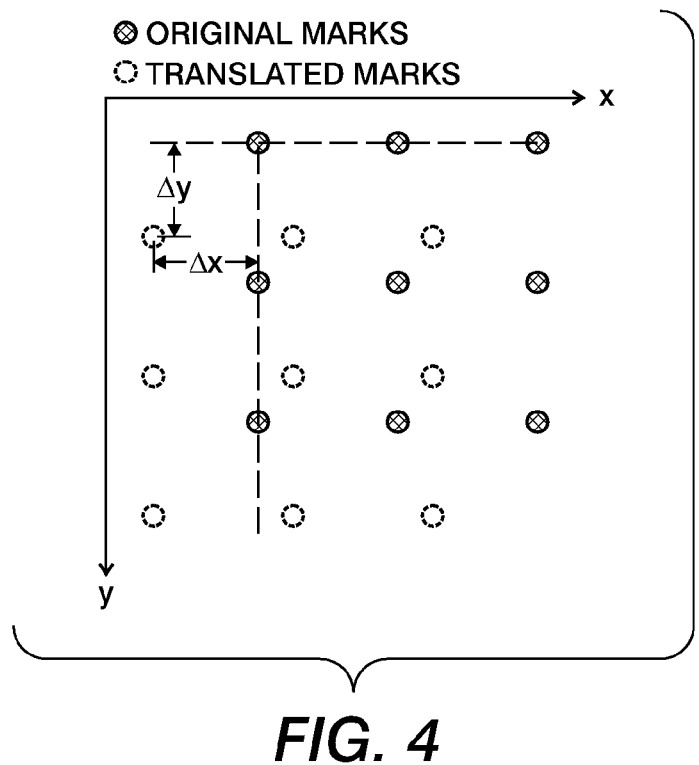
FIG. 4 shows translation of reference marks by $\Delta x$, $\Delta y$.

In FIG. 4, all reference marks are translated by $\Delta x$, $\Delta y$. $(x_{i,1}, y_{i,1})$ is the coordinate of the i-th reference mark in the first set of reference marks (or grid) 202 and $(x_{i,2}, y_{i,2})$ is the coordinates of the i-th point in the second set of reference marks (or grid) 204. $(\Delta x, \Delta y)$ are the translation adjustment amounts in process and cross-process direction on the second set of reference marks (or grid) 204 that are used to find particular translation values that minimize the MSE. Each set of reference marks (or grid) has totally M reference marks and the MSE with respect to translation amounts $\Delta x$, $\Delta y$ between the two sets of reference marks is:

$$MSE(\Delta x, \Delta y) = \sum_{i=1}^{M} \sqrt{[(x_{i,2} - \Delta x) - x_{i,1}]^2 + [(y_{i,2} - \Delta y) - y_{i,1}]^2} \Big/ M \qquad (1)$$

The minimization of MSE could be computed over various pairs of $(\Delta x, \Delta y)$. $(\Delta x_m, \Delta y_m)$ is the optimal translation adjustment pair such that MSE value in equation (1) is the minimal for all possible $(\Delta x, \Delta y)$ pairs.

Figure 5:
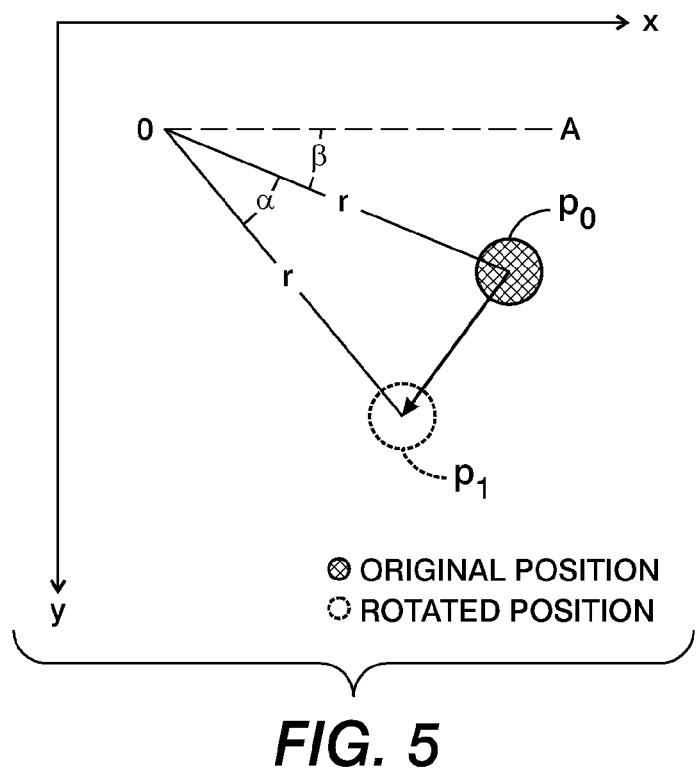
FIG. 5 shows rotation of a reference mark by angle $\alpha$.

The angle $\alpha$ is the amount of rotation applied globally to every reference mark in the second set of reference marks (or grid) 204 when used to find particular rotation amounts that minimize the MSE. The rotation could be centered at any location in the second set of reference. One instance of such rotation would be that the rotation is centered at the intersection of the first line of horizontal marks and the first line of vertical marks. FIG. 5 demonstrates rotation adjustment by angle $\alpha$ on one reference mark. The reference mark is originally located in position $p_0$ and the center of rotation is at point O. The coordinates of $p_0$ are $(x_{i,2}, y_{i,2})$, and $\beta$ is the original angle between the reference mark line $Op_0$ and one reference line OA. The distance between O and $p_0$ is r. The reference mark is rotated about O for angle $\alpha$ to position $p_1$ as indicated in the graph. Position $p_1$'s coordinates $(x'_{i,2}, y'_{i,2})$ can be expressed by the following equations:

$$x'_{i,2} = r \times \sin(\alpha + \beta) \qquad (2)$$

$$y'_{i,2} = r \times \cos(\alpha + \beta) \qquad (3)$$

$$r = \sqrt{x_{i,2}^2 + y_{i,2}^2} \qquad (4)$$

$$\beta = \tan^{-1}(y'_{i,2}/x'_{i,2}) \qquad (5)$$

For any given reference mark, its original position $p_0$, coordinates $(x_0, y_0)$, and $\beta$ are known. MSE with respect to rotational adjustment $\alpha$ between the two sets of reference marks is:

$$MSE(\alpha) = \sum_{i=1}^{M} \sqrt{(x'_{i,2} - x_{i,1})^2 + (y'_{i,2} - y_{i,1})^2} \Big/ M \quad (6)$$

where $(x'_{i,2}, y'_{i,2})$ is defined and obtained from equations (2) through (5)

The minimization of MSE could be done over $\alpha$, wherein $\alpha_m$ is the optimal rotational adjustment angle such that MSE value in equation (6) is the minimal for all possible angles $\alpha$.

Figure 6:
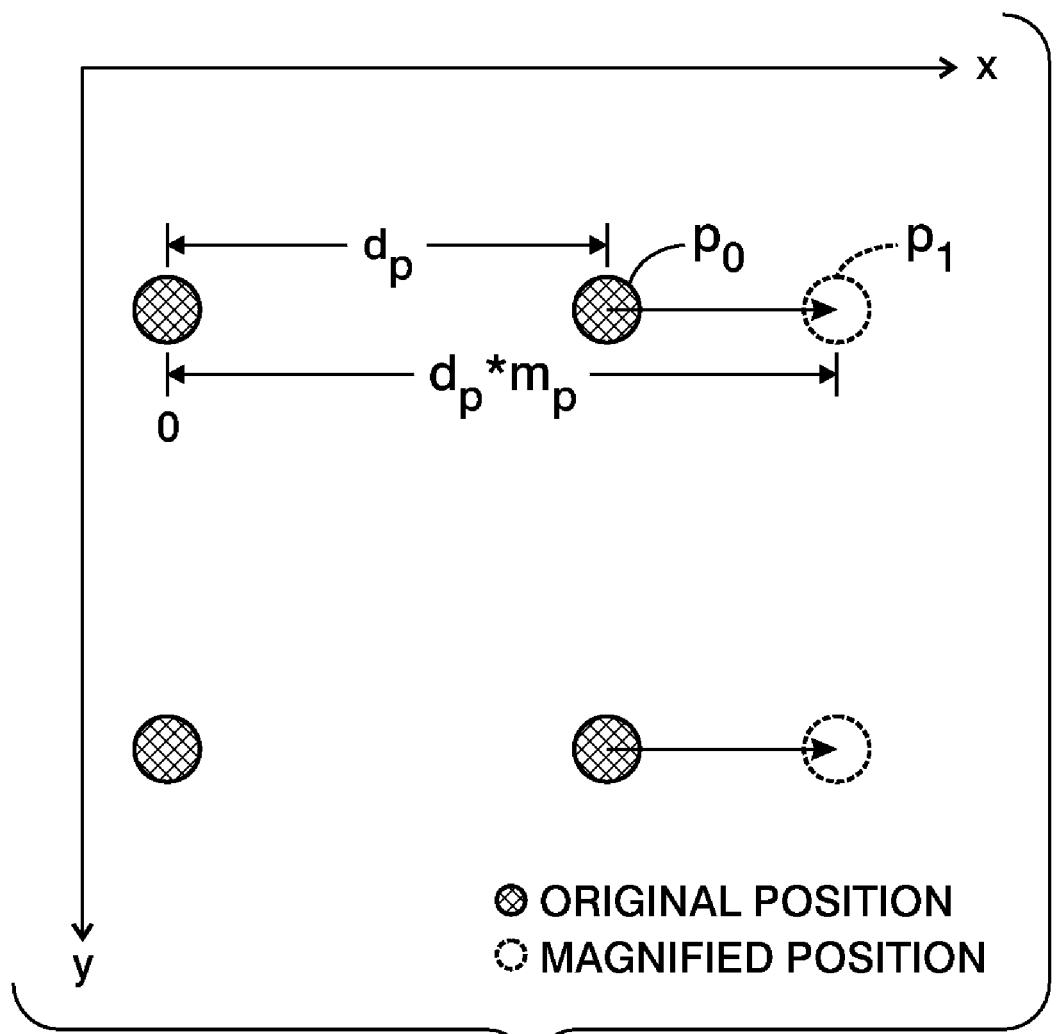
FIG. 6 shows magnification of a reference mark by a factor of $m_p$.

Magnification factors in process direction $m_p$ and cross-process direction $m_{xp}$ are applied to the second set of reference marks (or grid) 204 to minimize MSE between the first set of reference marks 202 and the second set 204. Magnification factors can be smaller than, larger than or equal to unity. FIG. 6 demonstrates magnification adjustment of two reference marks by one of the two magnification factors: magnification in process direction. One of the reference marks is originally located in position $p_0$ and the reference of magnification is at point O. The coordinates of $p_0$ are $(x_{i,2}, y_{i,2})$, and $d_p$ is the original distance in process direction between the reference mark O and the original position $p_0$. The distance between the reference mark O and the original position $p_0$ in the cross-process direction is $d_{xp}$. In FIG. 6, $d_{xp}$ is equal to 0, and is not shown. The reference mark is magnified with respect to O in the process direction for a factor of $m_p$ to position $p_1$ as indicated in the figure. Magnification in the cross-process direction $m_{xp}$ is equal to 1 in FIG. 6 and is not shown. The distance between O and $p_1$ is $d_p \times m_p$, and in this demonstration the process direction magnification factor is greater than unity. Position $p_1$'s coordinates $(x'_{i,2}, y'_{i,2})$ can be expressed by the following equations:

$$x'_{i,2} = d_p \times m_p = x_{i,2} \times m_p \quad (7)$$

$$y'_{i,2} = d_{xp} \times m_p = y_{i,2} \times m_p \quad (8)$$

For any given reference mark, its original position $p_0$, coordinates $(x_0, y_0)$, and $(d_x, d_{xp})$ are known. MSE with respect to magnification adjustments $(m_p, m_{xp})$ between the two sets of reference marks is:

$$MSE(m_p, m_{xp}) = \sum_{i=1}^{M} \sqrt{(x'_{i,2} - x_{i,1})^2 + (y'_{i,2} - y_{i,1})^2} \Big/ M \quad (9)$$

where $(x'_{i,2}, y'_{i,2})$ is defined and obtained from equations (7) and (8).

The minimization of MSE could be done over $(m_p, m_{xp})$. $(m_{p\_m}, m_{xp\_m})$ is the optimal magnification adjustment pair such that MSE value in equation (9) is the minimal for all possible $(m_p, m_{xp})$ pairs.

The MSE expressions above could be combined and the optimal solution could be obtained by minimizing simultaneously or in serial, one parameter at a time.

Some number of prints can be produced and analyzed in the described manner. For example, ten prints may be used. From this set of prints the repeatable misregistration components can be determined and later used in an adjustment operation to compensation for repeatable components.

The goal of the compensation method is to adjust one image to be in best possible alignment with another image rather than in alignment with an absolute position. The adjustment operations are equivalent and determined by what is required to move one grid (i.e., the second grid) to the other grid (i.e., the first grid) instead of moving one grid relative to an absolute reference point. Also, consider that for a relative measurement (two-grid lattice), the measurement error=$\Delta L \cdot x$ %. Also, it should be noted that the registration errors may differ for each type of paper. Hence the teachings herein are directed to grid-to-grid measurement that measure relative to an absolute coordinate system that may be referenced to the paper.

Figure 7:
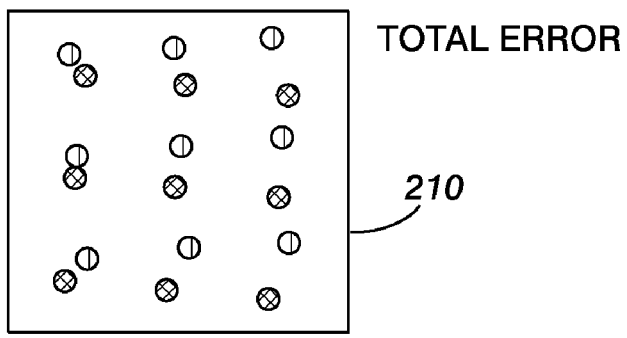
FIG. 7 illustrates an image with two sets of reference marks before eliminating errors.
Figure 8:
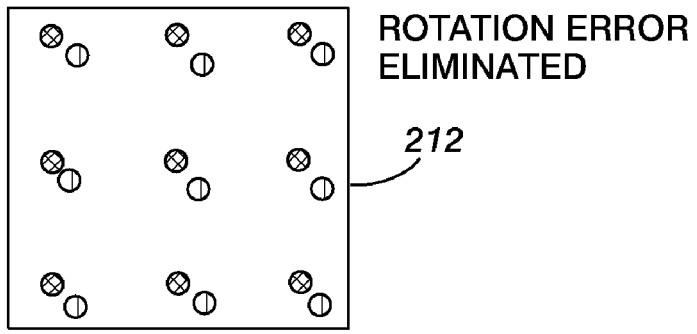
FIG. 8 illustrates an examples of an image in which rotation error has been eliminated.
Figure 9:
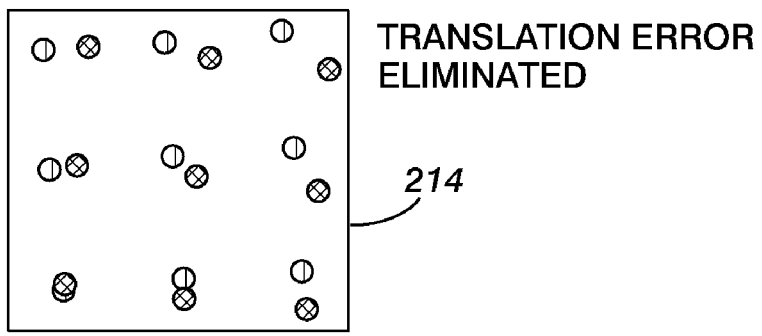
FIG. 9 illustrates an examples of an image in which translation error has been eliminated.
Figure 12:
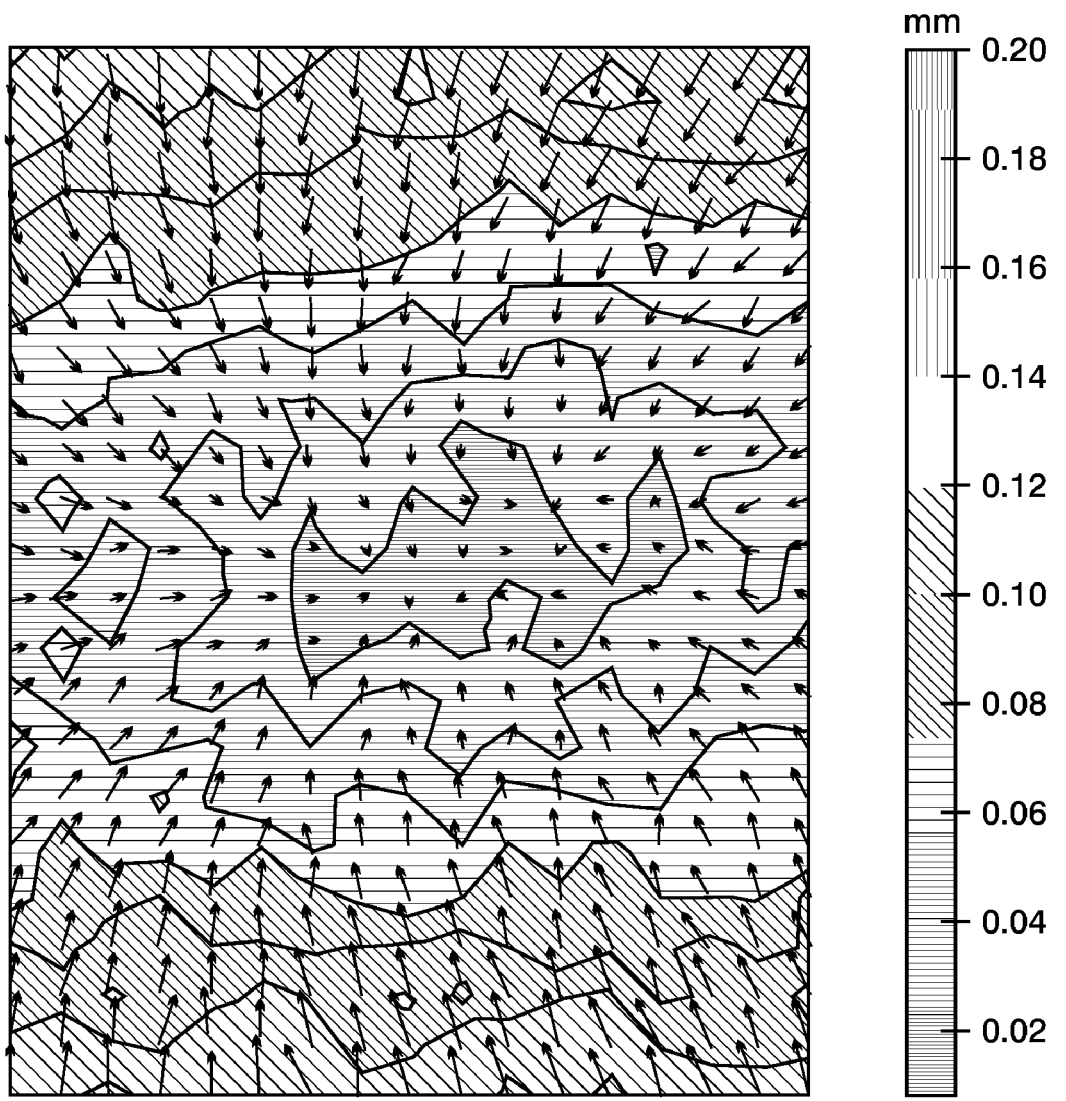
FIG. 12 shows average image-to-image misregistration for 24 lb. business 4200 paper.
Figure 13:
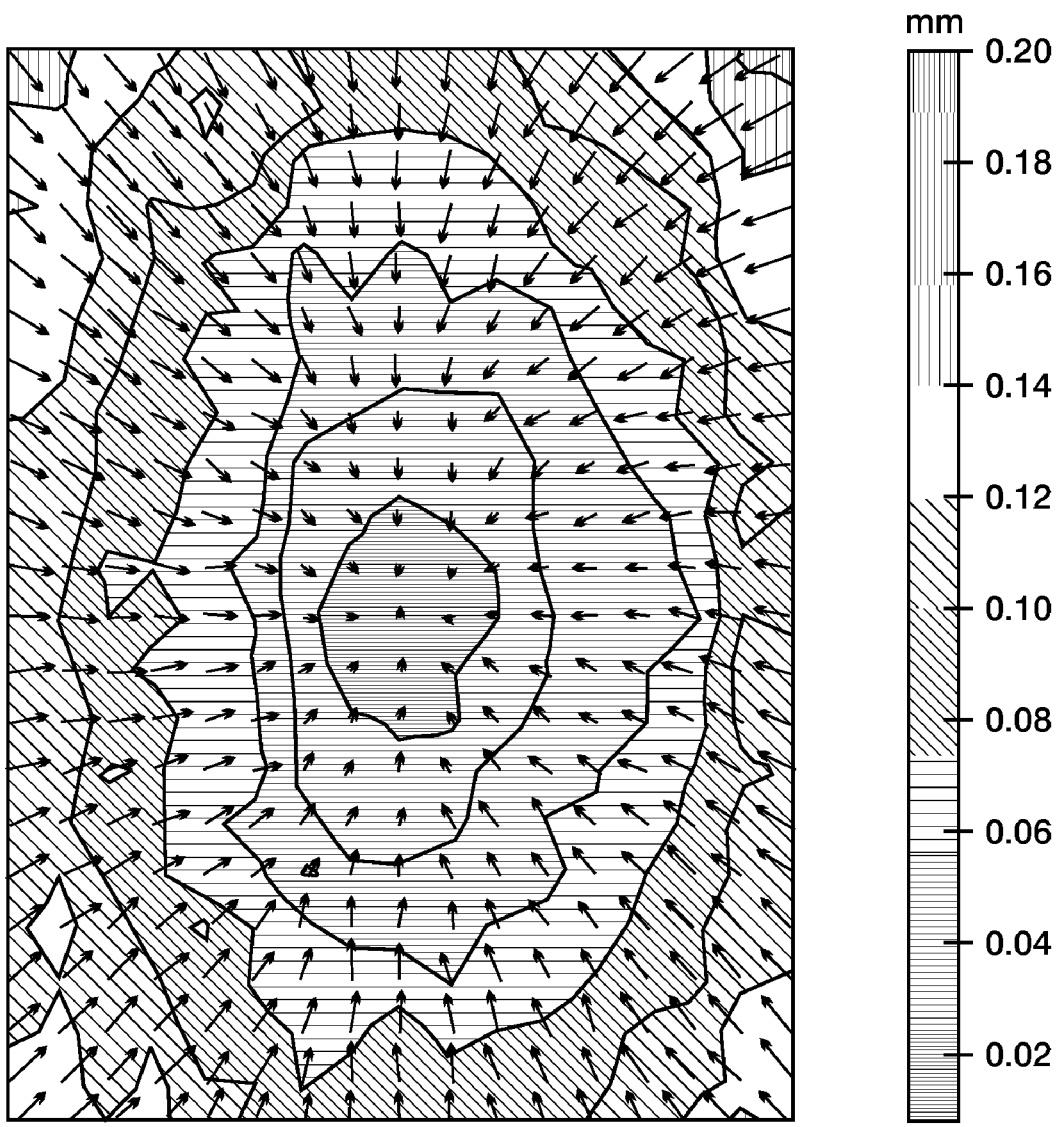
FIG. 13 shows average image-to-image misregistration for 20 lb. recycled paper.
Figure 14:
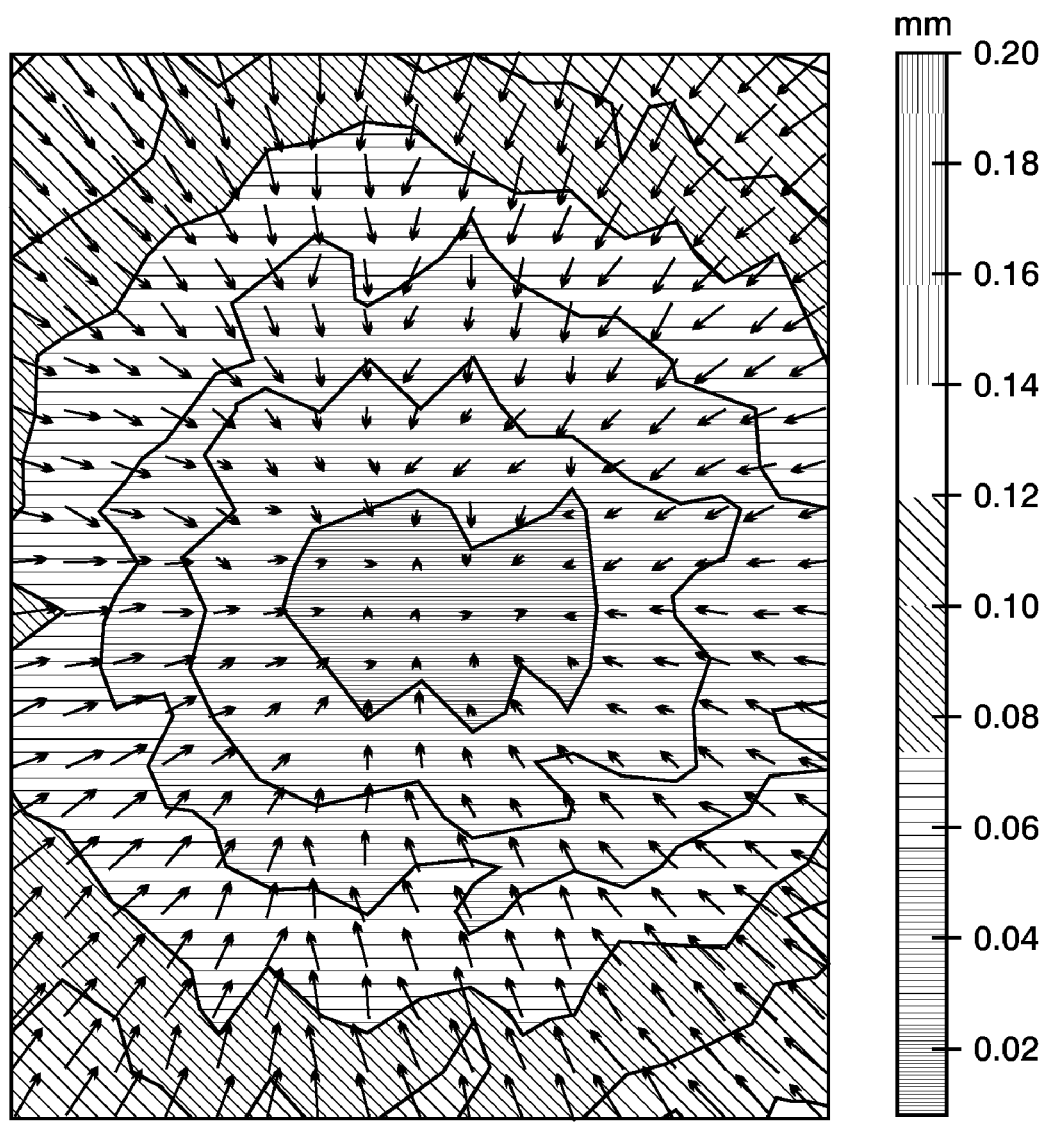
FIG. 14 shows average image-to-image misregistration for 20 lb. 25% cotton paper.
Figure 15:
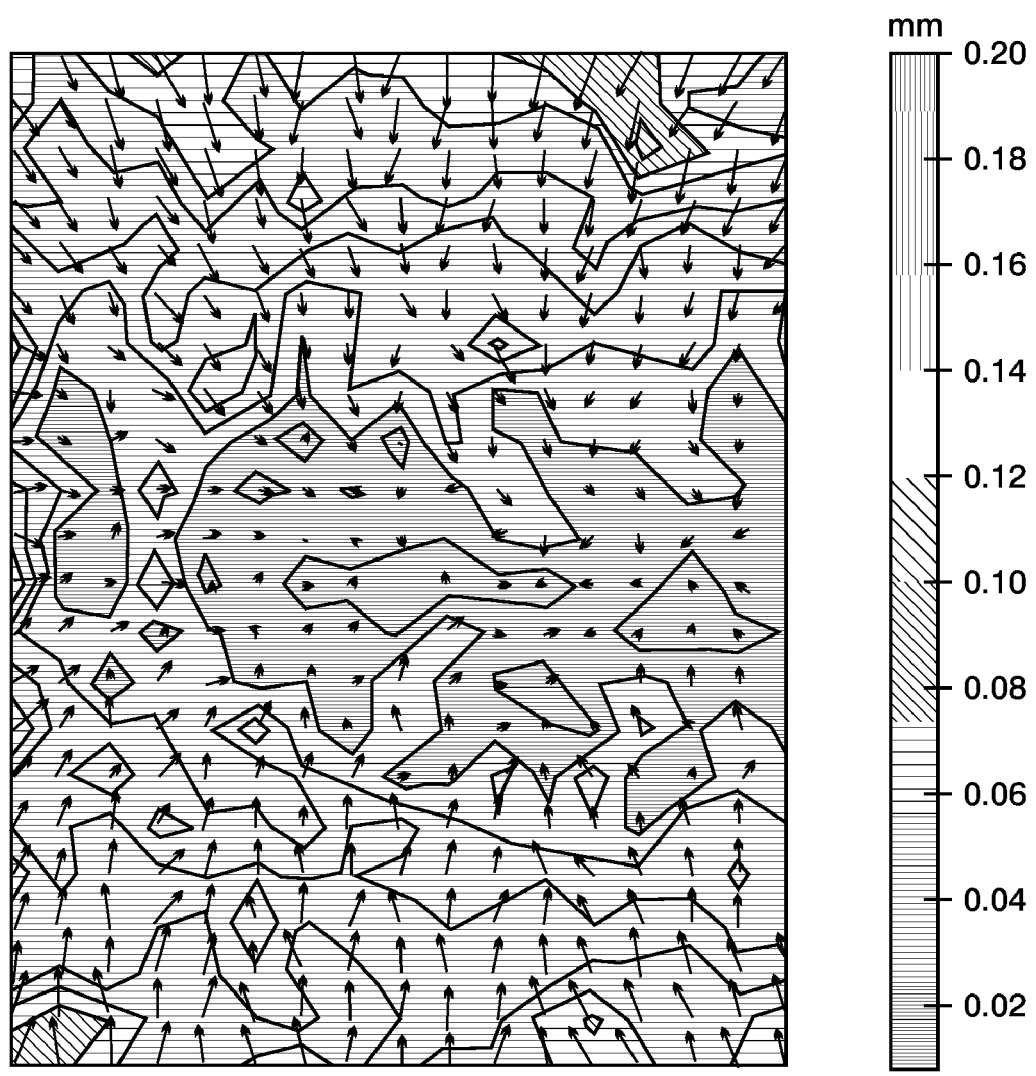
FIG. 15 shows average image-to-image misregistration for 32 lb. Xpression paper.

Prior to determining the image-to-image distortion map, the image analysis includes eliminating the non-repeatable misregistration components. For example, the image analysis may remove from the calibration prints one or more of global lateral offset between the first and second sets of reference marks, global rotation between the first and second sets of reference marks, and/or global magnification between the first and second sets of reference marks. To remove global lateral offset, the distortion determination unit 20 can shift, in process and cross-process directions, the second image by the optimal offset $(\Delta x_m, \Delta y_m)$ determined by minimizing MSE between the calibration prints with the first and second sets of reference marks. The distortion compensation unit 22 moves the image by $\Delta x_m$ and $\Delta y_m$ in the process direction and the cross process direction, respectively, to remove global lateral offset. To remove global rotation, distortion compensation unit can rotate the second image by angle $\alpha_m$ determined by minimizing MSE. The center of rotation of the second image is the same position used in minimizing MSE by the calibration prints. To remove global magnification, the distortion compensation unit 22 can scale up or scale down the second image by magnification factors $m_{p\_m}, m_{xp\_m}$ in both process and cross-process directions respectively determined by minimizing MSE. The origin of magnification is the same as the position used in minimizing MSE by the calibration prints. The removal of the above could be combined simultaneously or in serial, one parameter at a time. FIG. 7 illustrates the two sets of reference marks before eliminating errors. FIGS. 8-11 illustrate several examples of images in which various types of errors have been eliminated, including rotation error (FIG. 8), translation error (FIG. 9), magnification, translation and rotation error (FIG. 10), and both rotation and translation error (FIG. 11).

Above we described taking global errors out of the grid-to-grid measurement. One purpose was to determine if those components were repeatable over multiple sets of prints. If they were not repeatable then the global error is taken out prior to determining local distortion. If they are repeatable, then they are included in the distortion to be corrected in future customer prints. If one of more repeatable global errors is more significant than the local errors, then the distortion map used for compensation can be defined by the parameters that define the global errors. If both global errors and local errors are repeatable, then the distortion map used for compensation can be represented by both global parameters and local displacements, or the global errors can be converted to local displacements and combined with the other local displacements.

Figure 16:
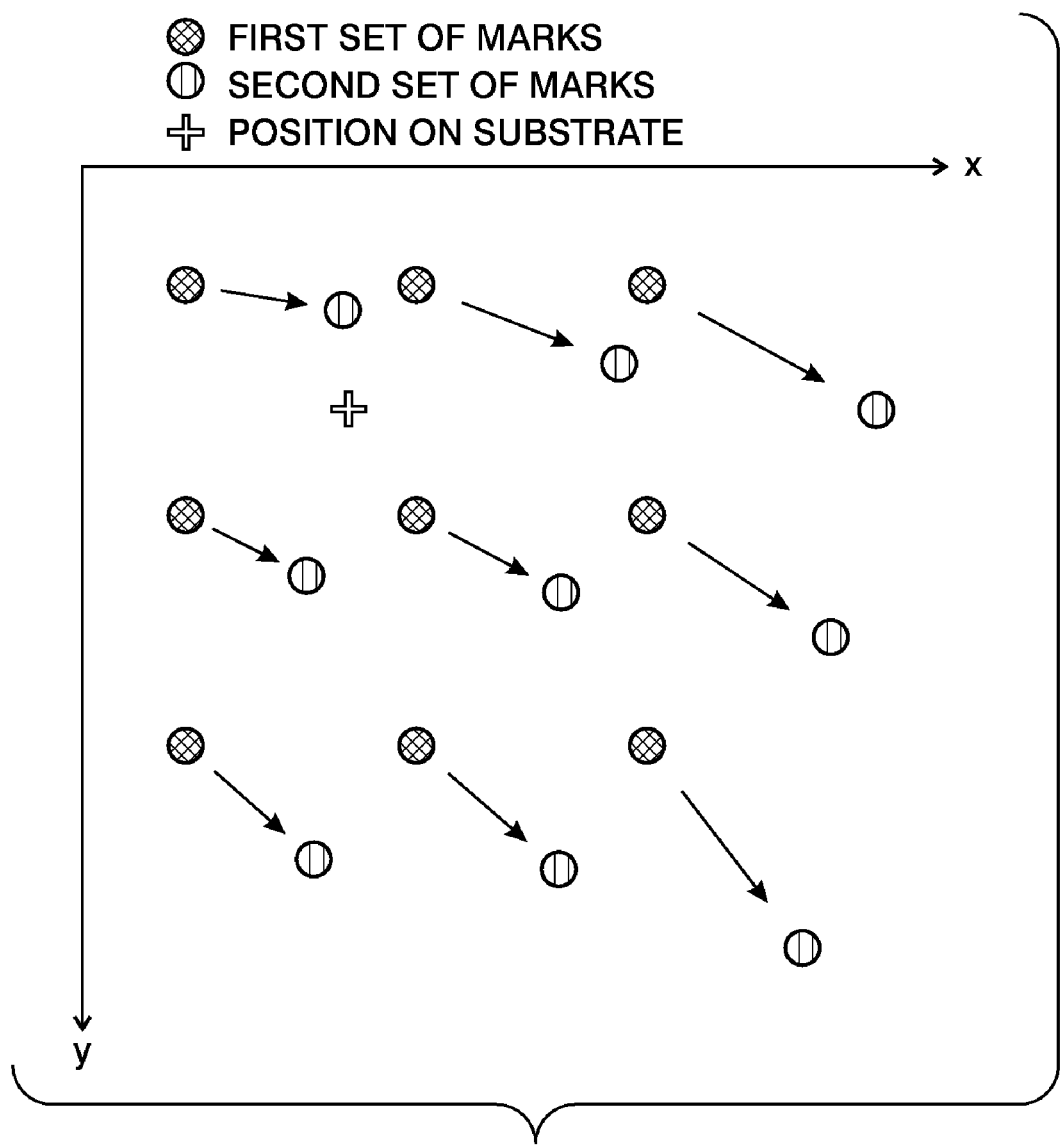
FIG. 16 shows the distortion vectors from one set of reference marks to another.

The image-to-image distortion map generally consists of an array of distances relating a grid formed by the second set of reference marks to a grid formed by the first set of registration marks. Multiple examples of an image-to-image distortion map (average for specific type of paper) are shown in FIGS. 12-15. In this way, compensation parameters are developed. The image sensing unit 8 in the system 2 determines the position of every mark in the first and second set of reference marks. For the same mark in both sets, displacement vectors are computed as in FIG. 6, pointing from the mark in first set to the same mark in the second set. The displacement vector for each mark represents the combined misregistration of the system 2 in FIG. 1 at the position where the mark is located on paper. To obtain a finer distortion measurement for the position that is not of the correct position of the reference marks, an interpolation method may be used. As shown in FIG. 16, the cross shape mark represents one location that is not in the reference sets. The distortion measurement of the location is interpolated from its neighboring location's distortion measurements. Its distortion measurement $V_d$ can be expressed as:

$$V_d = \sum_{k=1}^{N} w_k * V_k \quad (10)$$

where $w_k$ is the weighing factor for the k-th neighboring distortion vector and $V_k$ is the distortion measurement (vector) of the k-th neighboring reference mark.

For locations that are not represented by a mark, their displacement measurements are obtained by interpolating the displacements of the surrounding marks. For a specific media, multiple prints with sets of reference marks are produced and measured using image sensing unit. Displacement vectors are averaged for the same position for different prints. An image-to-image distortion map is composed using the averaged displacement vectors. A compensated digital image to reduce registration error is then generated by the distortion compensation unit 22. In this regard, electronic registration is applied to the customer image according to the desired adjustments (digital image warping) to modify (or pre-distort) the customer image before printing with the second print engine 6.

Electronic registration refers to adjusting the spatial positions on the image substrate that the image structures, such as lines and halftone dots, will be placed by the print engine to compensate for any physical offsets in the print engine that would otherwise result in misregistration between the color separation layers. That is, rather than physically (or mechanically) ensuring that the color separation layers are precisely aligned, the various offsets between the various color separation layers are measured. The electronic data is then electronically modified to change the spatial locations of the resulting image structures so that the resulting image structures of each corresponding color separation layer are properly aligned. Being able to move or warp an image structure, such as lines or halftone dots, without causing moiré patterns or noise that detract from the image quality increases the utility of electronic registration. Digital image warping is well known in the art and is commonly used to compensate for geometric and optical distortions. A thorough discussion of digital image warping may be found, for example, in George Wolberg's *"Digital Image Warping"*, IEEE Computer Society Press, Los Alamitos, Calif., 1990.

Digital image warping may be applied to the customer image content that is to be written by the second print engine 6 so that its subject matter occurs in register with image content of the first printing. In general, the desired adjustment values provide interpolation nodes and values that can be used in a warping algorithm applied to the second part of the customer image. There are several possible warping schemes. For instance, the warp can be applied on the binary halftoned image, as described in US 2003/0175602 A1 by Kazama, and US 2006/0092264 A1, by Matsuzaki et al., each of which is incorporated by reference herein. Also, the warp could be applied to the contone image.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
    printing a first set of reference marks on one side of a substrate with a first print engine;
    printing a second set of reference marks on the same side of the substrate as the first set of reference marks with a second print engine;
    sensing both sets of reference marks on the substrate with an image sensing unit and generating a digital image of the reference marks;
    performing image analysis on the digital image to obtain an image-to-image distortion map where the image-to-image distortion map is a local measure of difference between the first set of reference marks and the second set of reference marks, wherein the image-to-image distortion map comprises an array of distances relating a grid formed by the second set of reference marks to a grid formed by the first set of registration marks; and
    generating a compensated customer image by using the image-to-image distortion map to reduce registration errors when using the first and second print engines.

2. The method of claim 1, wherein, prior to obtaining the image-to image distortion map, the image analysis includes determining global errors between the reference marks and where the global errors were not repeatable over multiple sets of prints, eliminating one of global lateral offset between the first set of reference marks and the second set of reference marks, global rotation between the first set of reference marks and the second set of reference marks, and global lateral offset and global rotation between the first set of reference marks and the second set of reference marks.

3. The method of claim 1, wherein, prior to obtaining the image-to image distortion map, the image analysis includes determining global errors between the reference marks and where the global errors were repeatable over multiple sets of prints, including the global errors in the distortion to be corrected in future customer prints.

4. The method of claim 1, wherein, prior to obtaining the image-to image distortion map, the image analysis includes determining global errors between the reference marks and where one or more global errors is more significant than a set of local displacements, representing the distortion map used for compensation by both global parameters and local displacements.

5. The method of claim 1, wherein, prior to obtaining the image-to image distortion map, the image analysis includes determining global errors between the reference marks and where the global errors and a first set of local displacements are both repeatable, representing the distortion map used for compensation by both global parameters and local displacements or converting the global errors to a second set of local displacements and combined with the first set of local displacements.

6. The method of claim 1, wherein each set of reference marks comprises a plurality of one of dots in a written grid pattern and lines in a written grid pattern.

7. The method of claim 6, wherein each written grid pattern represents a different colorant.

8. The method of claim 7, wherein the first written grid pattern is black and the second grid pattern is one of cyan, magenta, yellow, black, orange, violet, red, green, light cyan, light magenta, gray, and dark yellow.

9. The method of claim 1, wherein the image sensing unit comprises a full width array.

10. The method of claim 1, wherein each of the print engines comprises a xerographic printer.

11. An apparatus comprising:
   a first print engine that prints a first set of reference marks on one side of a substrate;
   a second print engine that prints a second set of reference marks on the same side of the substrate;
   an image sensing unit operative to sense both sets of reference marks on the substrate to generate a digital image of the reference marks;
   a distortion determining unit operative to determine distortion between the print engines based on analysis of the digital image of the reference marks, wherein the distortion is represented by an image-to-image distortion map comprising an array of distances relating to a grid formed by the second set of reference marks to a grid formed by the first set of reference marks; and
   a distortion compensation unit operative to generate a digital image that has been compensated to reduce registration errors between images produced by the first print engine and second print engine through the use of the distortion determined from the reference marks from the two print engines.

12. The apparatus of claim 11, wherein the image analysis includes estimating the relative registration errors in the second set of reference marks with respect to the first set of reference marks.

13. The apparatus of claim 11, wherein each set of reference marks comprises one of a plurality of dots in a grid pattern and a plurality of lines in a grid pattern.

14. The apparatus of claim 13, wherein each grid pattern represents a different colorant.

15. The apparatus of claim 13, wherein the first grid pattern is black and the second grid pattern is one of cyan, magenta, yellow, black, orange, violet, red, green, light cyan, light magenta, gray, and dark yellow.

16. The apparatus of claim 11, wherein the image sensing unit comprises a full width array.

17. The apparatus of claim 11, wherein each of the print engines comprises a xerographic printer.

18. The apparatus of claim 11, wherein the registration errors comprise at least one of translational, rotational and magnification errors.

19. The apparatus of claim 11, wherein the distortion compensation unit is operatively connected to the second print engine.

20. A non-transitory computer readable medium
   storing instructions that, when executed by a computer, cause the computer to perform a method comprising:
   printing a first set of reference marks on one side of a substrate with a first print engine;
   printing a second set of reference marks on the same side of the substrate as the first set of reference marks with a second print engine;
   sensing both sets of reference marks on the substrate with an image sensing unit and generating a digital image of the reference marks;
   performing image analysis on the digital image to obtain an image-to-image distortion map where the image-to-image distortion map a is local measure of difference between the first set of registration marks and the second set of registration marks, wherein the image-to-image distortion map consists of an array of distances relating a grid formed by the second set of reference marks to a grid formed by the first set of registration marks; and
   generating a compensated digital image by using the image-to-image distortion map to reduce registration errors when using the first and second print engines.

21. The computer program product of claim 20, wherein, prior to obtaining the image-to image distortion map, the image analysis includes eliminating one of global lateral offset between the first set of reference marks and the second set of reference marks, global rotation between the first set of reference marks and the second set of reference marks, and global lateral offset and global rotation between the first set of reference marks and the second set of reference marks.

* * * * *